(12) United States Patent
Cheng

(10) Patent No.: US 9,804,640 B2
(45) Date of Patent: Oct. 31, 2017

(54) CHASSIS DOOR COVER SWITCH STRUCTURE

(71) Applicant: PORTWELL INC., New Taipei (TW)

(72) Inventor: Yi Chen Cheng, New Taipei (TW)

(73) Assignee: PORTWELL INC., New Taipei (TW)

( * ) Notice: Subject to any disclaimer, the term of this patent is extended or adjusted under 35 U.S.C. 154(b) by 0 days.

(21) Appl. No.: 15/147,479

(22) Filed: May 5, 2016

(65) Prior Publication Data

US 2016/0334838 A1   Nov. 17, 2016

(30) Foreign Application Priority Data

May 13, 2015  (TW) .............................. 104207341 U

(51) Int. Cl.
| | |
|---|---|
| *A47B 88/00* | (2017.01) |
| *G06F 1/18* | (2006.01) |
| *E05B 65/00* | (2006.01) |
| *E05B 65/52* | (2006.01) |
| *E05C 1/04* | (2006.01) |
| *E05B 15/00* | (2006.01) |

(52) U.S. Cl.
CPC .......... *G06F 1/182* (2013.01); *E05B 15/0053* (2013.01); *E05B 65/006* (2013.01); *E05B 65/5238* (2013.01); *E05C 1/04* (2013.01)

(58) Field of Classification Search
CPC ........ E05C 3/042; E05C 1/04; E05B 17/2088; E05B 15/0053; E05B 65/006; E05B 65/5238; G02B 6/4452; Y10S 292/11; G06F 1/182
See application file for complete search history.

(56) References Cited

U.S. PATENT DOCUMENTS

| | | | | |
|---|---|---|---|---|
| 7,789,437 B2 * | 9/2010 | Sheng | ................... | G06F 1/1658 292/137 |
| 2011/0217017 A1 * | 9/2011 | Drouard | ................ | H02G 3/088 385/135 |
| 2012/0262042 A1 | 10/2012 | Chen et al. | | |

* cited by examiner

*Primary Examiner* — Hanh V Tran

(74) *Attorney, Agent, or Firm* — Muncy, Geissler, Olds & Lowe, P.C.

(57) ABSTRACT

A chassis door cover switch structure of an electronic device is disclosed. The electronic device includes a casing and a cover. The casing includes a latch member having a main body and a stop portion, and a plug-in space formed between the two. The cover is covered onto the casing, the locked status of both cover and casing is controlled by a control member that includes a switching button on an outer side of the cover and a switching plate on an inner side of the cover. The switching button is connected to the switching plate with a tongue portion. When the control member is moved and the tongue portion is situated outside the plug-in space, the cover and the casing are unlocked. When the tongue portion is extended into the plug-in space and stopped by the stop portion, the cover and the casing are locked.

5 Claims, 6 Drawing Sheets

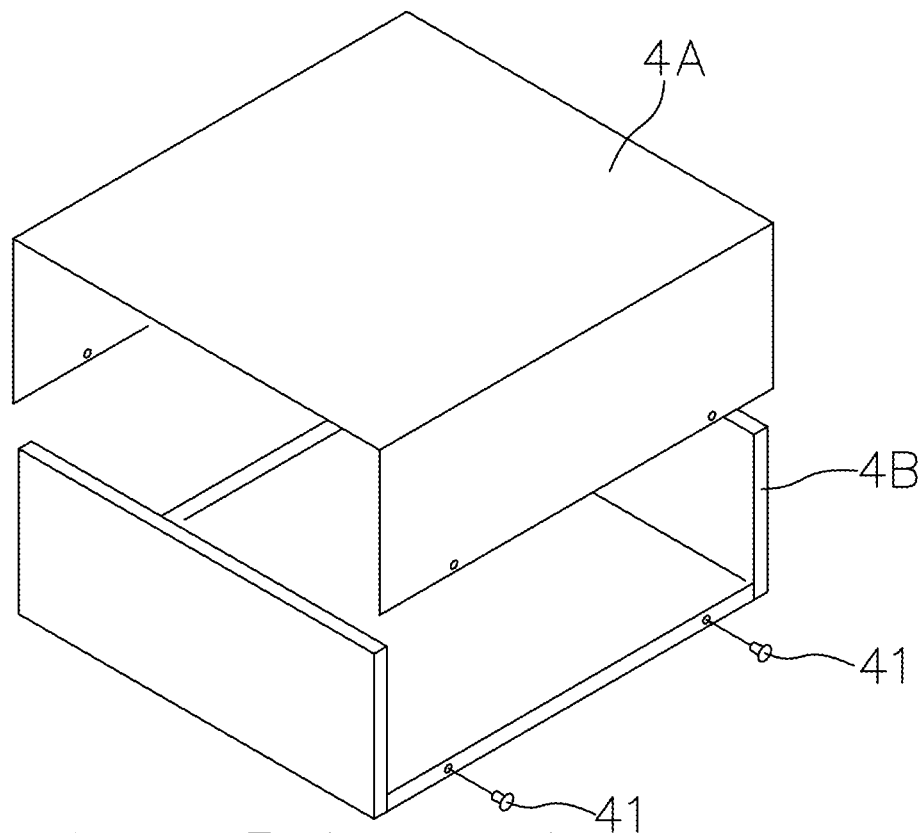
FIG 1 — Prior Art
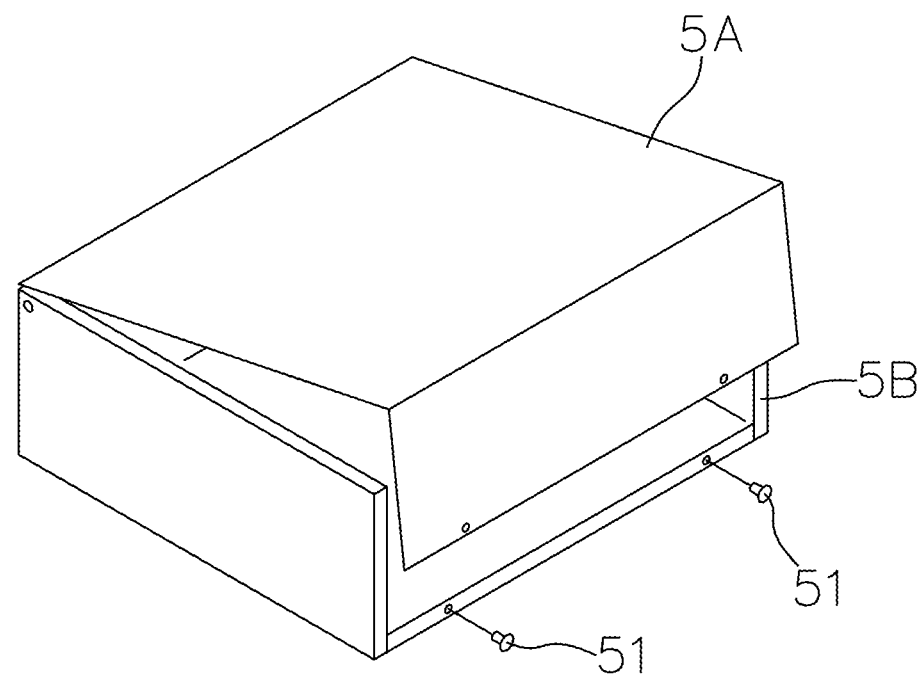
FIG 2 — Prior Art

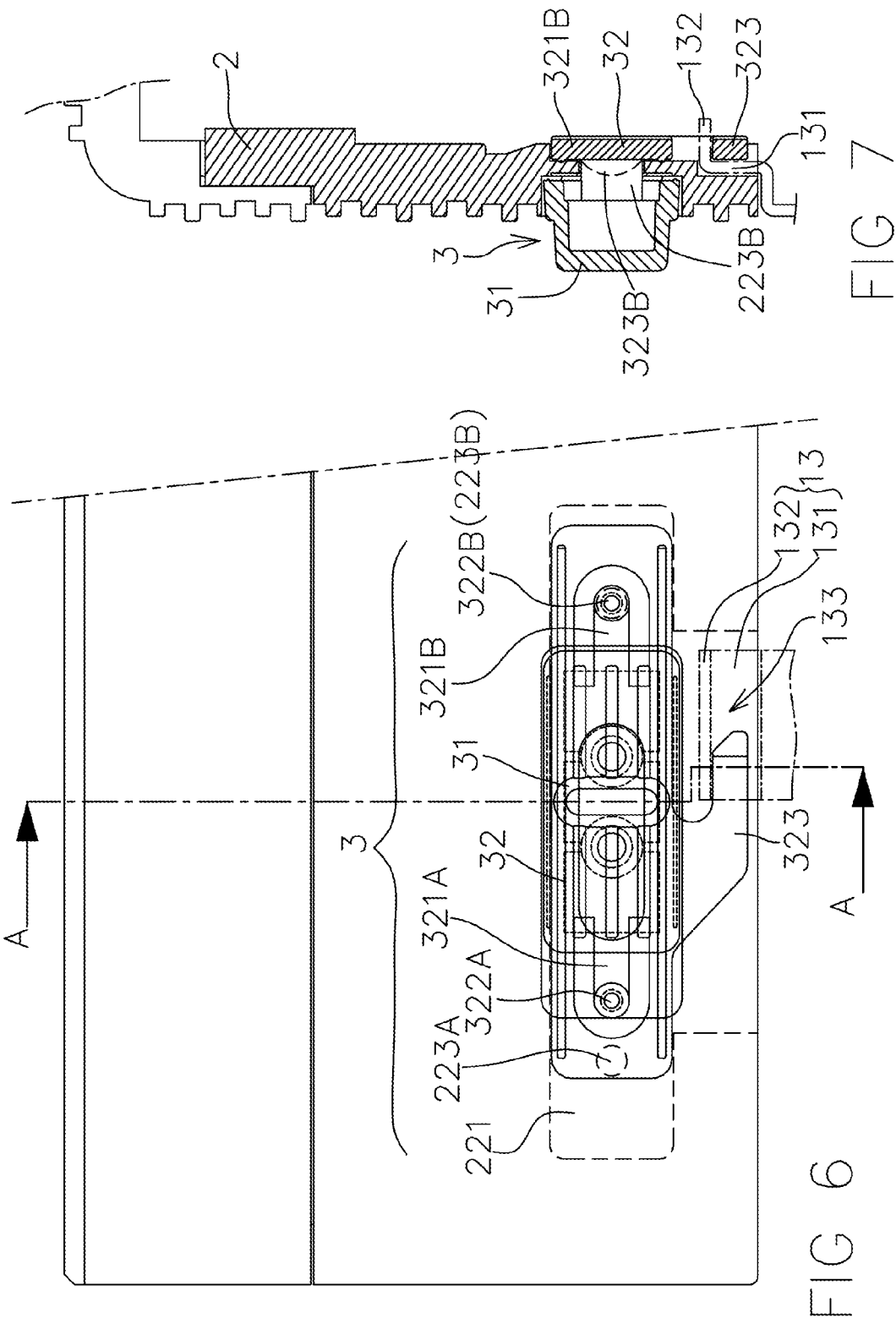

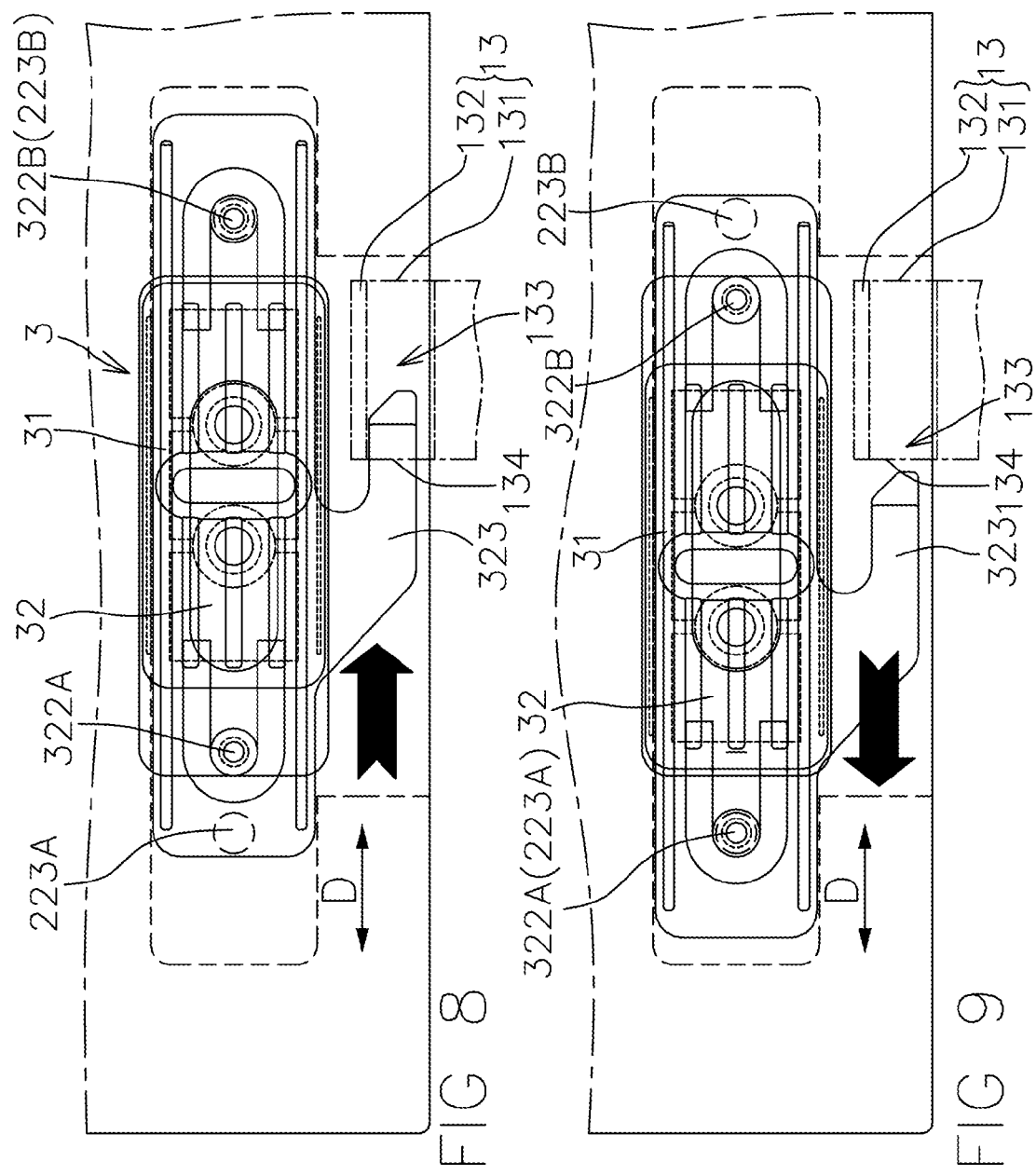

CHASSIS DOOR COVER SWITCH STRUCTURE

FIELD OF THE INVENTION

The present invention relates to a switch structure, and more particularly to a switch structure of a chassis door cover of an electronic device.

BACKGROUND OF THE INVENTION

In general, a chassis is provided for installing and containing electronic components. For example, components of an electronic device of a computer system are installed and contained in a chassis. With reference to FIG. 1 for a common conventional chassis, the chassis is an enclosed box formed by at least two panels 4A, 4B and provided for installing and containing the electronic components therein, and a connecting component 41 is installed between the panels 4A, 4B for connecting the panels 4A, 4B as shown in the figure, wherein the connecting component 41 is a screw for locking and fixing the adjacent panels 4A, 4B to form a closed box.

With reference to FIG. 2 for another conventional chassis, this conventional chassis comprises a cover 5A and a casing 5B, and the cover 5A is pivotally installed to a side of the casing 5B and pivoted with respect to the casing 5B. By pivoting the cover 5A towards the casing 5B, the cover 5A is covered onto the casing 5B to form an enclosed box for containing the electronic components therein. Similarly, a connecting component is provided for connecting the cover 5A to the casing 5B as shown in the figure, wherein the connecting component 51 is a screw for locking or securing the cover 5A with the casing 5B to close the box.

However, when it is necessary to maintain or repair the electronic device, both of the aforementioned conventional structures have to remove the connecting components 41, 51 by a tool such as a screwdriver first, and such operation is inconvenient and takes time. In view of the drawback of the conventional structure, it is a main subject of the present invention to find a feasible solution to overcome the drawback of the prior art.

SUMMARY OF THE INVENTION

Therefore, it is a primary objective of the present invention to provide a chassis door cover switch structure capable of controlling the locked and unlocked status of a chassis door cover by the displacement of a locking component as well as providing a simple, convenient, and time-saving operation.

To achieve the aforementioned and other objectives, the present invention provides a chassis door cover switch structure, comprising: a casing, having a chamber enclosed therein, and at least one latch member extending into the chamber, and the latch member having a main body, a stop portion, and a plug-in space formed between the main body and the stop portion; a cover, installed to the casing, and covered onto the chamber, and having an inner side facing the chamber and an outer side facing away from the chamber; and at least a control member, with a quantity corresponsive to the quantity of the latch members, and each control member including a switching button installed on an outer side of the cover, a switching plate installed on an inner side of the cover, and a tongue portion extended from the switching plate, and the switching button being coupled to the switching plate, and the switching button and the switch plate synchronously moving between a first position and a second position along a moving direction.

Wherein, the first position refers to the position when the tongue portion of the switching plate is situated outside the plug-in space, the cover and the casing are situated at an unlocked status.

Wherein, the second position refers to the position when the tongue portion of the switching plate is extended into the plug-in space and stopped by the stop portion, the cover and the casing are situated at a locked status Wherein, the inner side of the cover has two positioning holes formed at positions corresponsive to the latch members respectively, and the two positioning holes are arranged along the moving direction and apart from each other, and two positioning portions are extended from the switching plate, and the distance between the two positioning portions is smaller than the distance between the two positioning holes. When the switching button drives the switching plate to move to the first position or the second position, the switching plate is positioned into one of the positioning holes by one of the positioning portions.

The technical characteristics, contents, advantages and effects of the present invention will be apparent with the detailed description of a preferred embodiment accompanied with the illustration of related drawings as follows.

BRIEF DESCRIPTION OF THE DRAWINGS

FIG. 1 is an exploded view of a first conventional structure;

FIG. 2 is an exploded view of a second conventional structure;

FIG. 6 is a schematic planar view of a switch structure of the present invention;

FIG. 7 is a cross-sectional view of Section A-A of FIG. 6, and

FIGS. 8 and 9 are schematic views showing the movement of the switch structure of the present invention.

DESCRIPTION OF THE PREFERRED EMBODIMENTS

Figure 3:
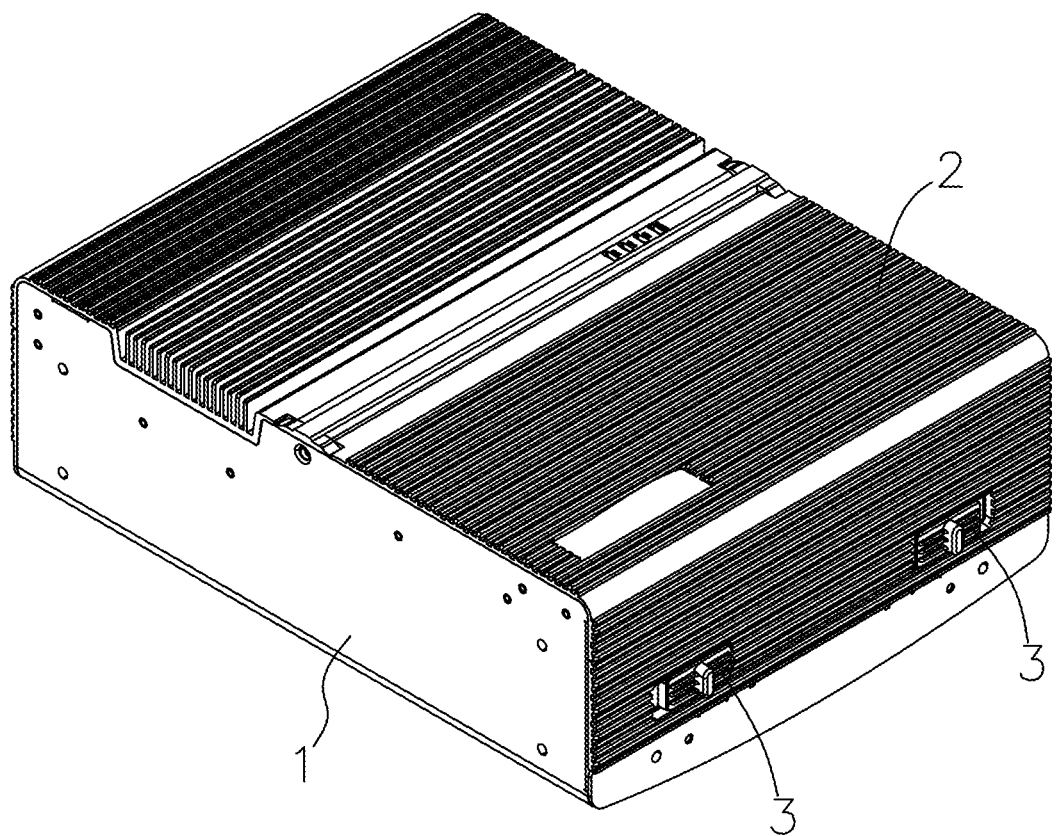
FIG. 3 is a schematic view of a cover of the present invention when the cover is closed.
Figure 4:
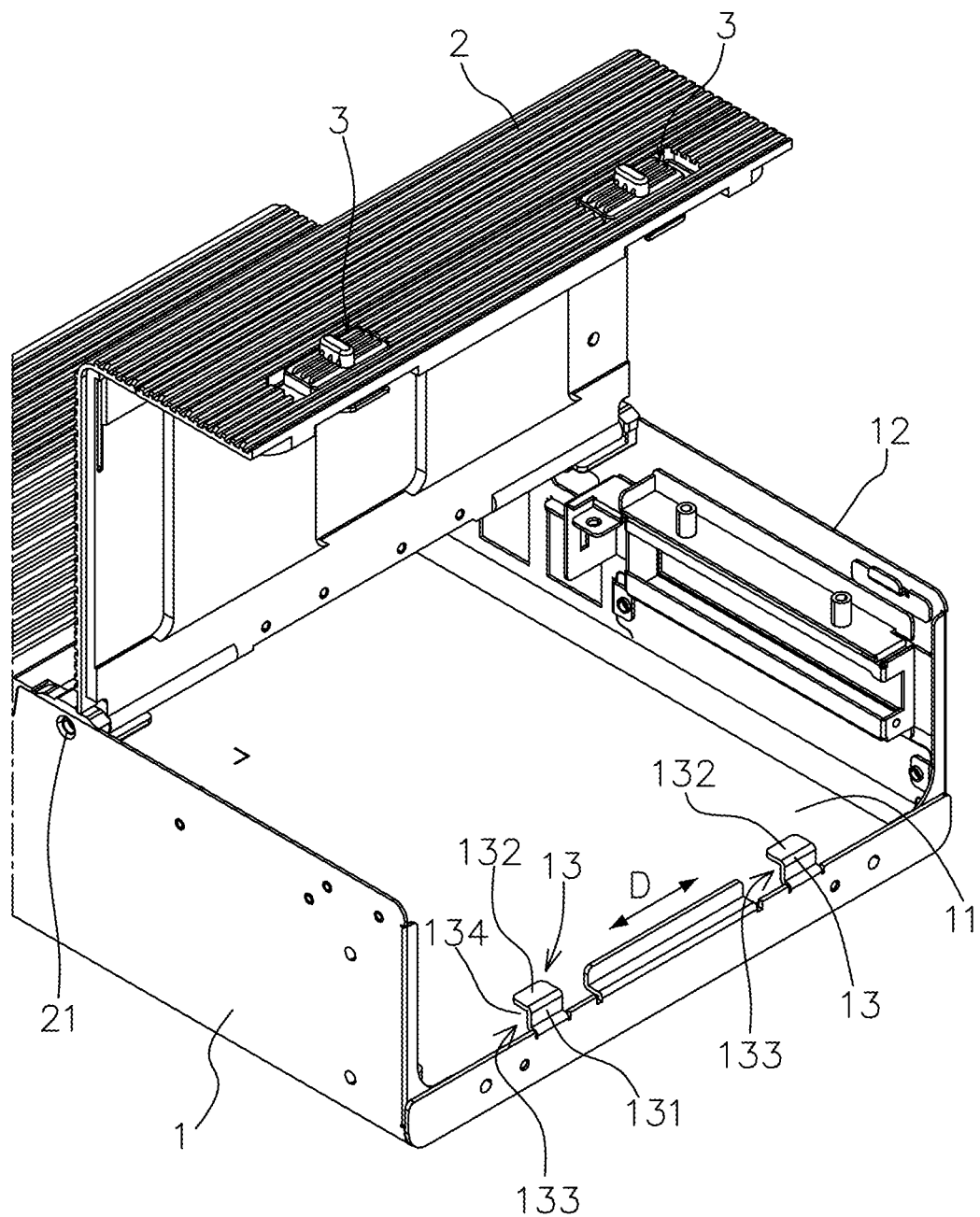
FIG. 4 is a schematic view of a cover of the present invention when the cover is opened.

With reference to FIGS. 3 and 4 for a chassis door cover switch structure of the present invention, the chassis door cover switch structure is a box formed by a casing 1 and a cover 2. In this embodiment, the casing 1 includes a chamber 11 having an opening 12 for containing electronic devices and components, and the cover 2 is pivotally installed to both sides of the opening 12 by a pivot 21, and the pivotal rotation of the cover 2 allows the cover 2 to be covered onto the casing 1 to close the chamber 11.

The casing 1 and the cover 2 control the locked status by using a control member 3, and the casing 1 includes at least one latch member 13 installed at an edge of the opening 12, and the cover 2 includes a control member 3 configured to be corresponsive to each respective latch member 13, so that after the cover 2 covers the casing 1, the control member 3 may be pushed to separate or embed the latch member 13 in order to switch the locked status and the unlocked status of the casing 1 and the cover 2.

In FIG. 4 as well as FIGS. 6 and 7, the latch member 13 is extended from the opening 12 of the casing 1 into the chamber 11, and the latch member comprises a main body 131 and a stop portion 132, wherein the stop portion 132 is disposed at the top end of the main body 131 and a plug-in space 133 is formed between the stop portion 132 and the main body 131, and a socket 134 is formed at a side edge of the main body 131. In other words, the plug-in space 133 is formed and extended from the socket 134 along a defined moving direction D.

Figures 5, 5A:
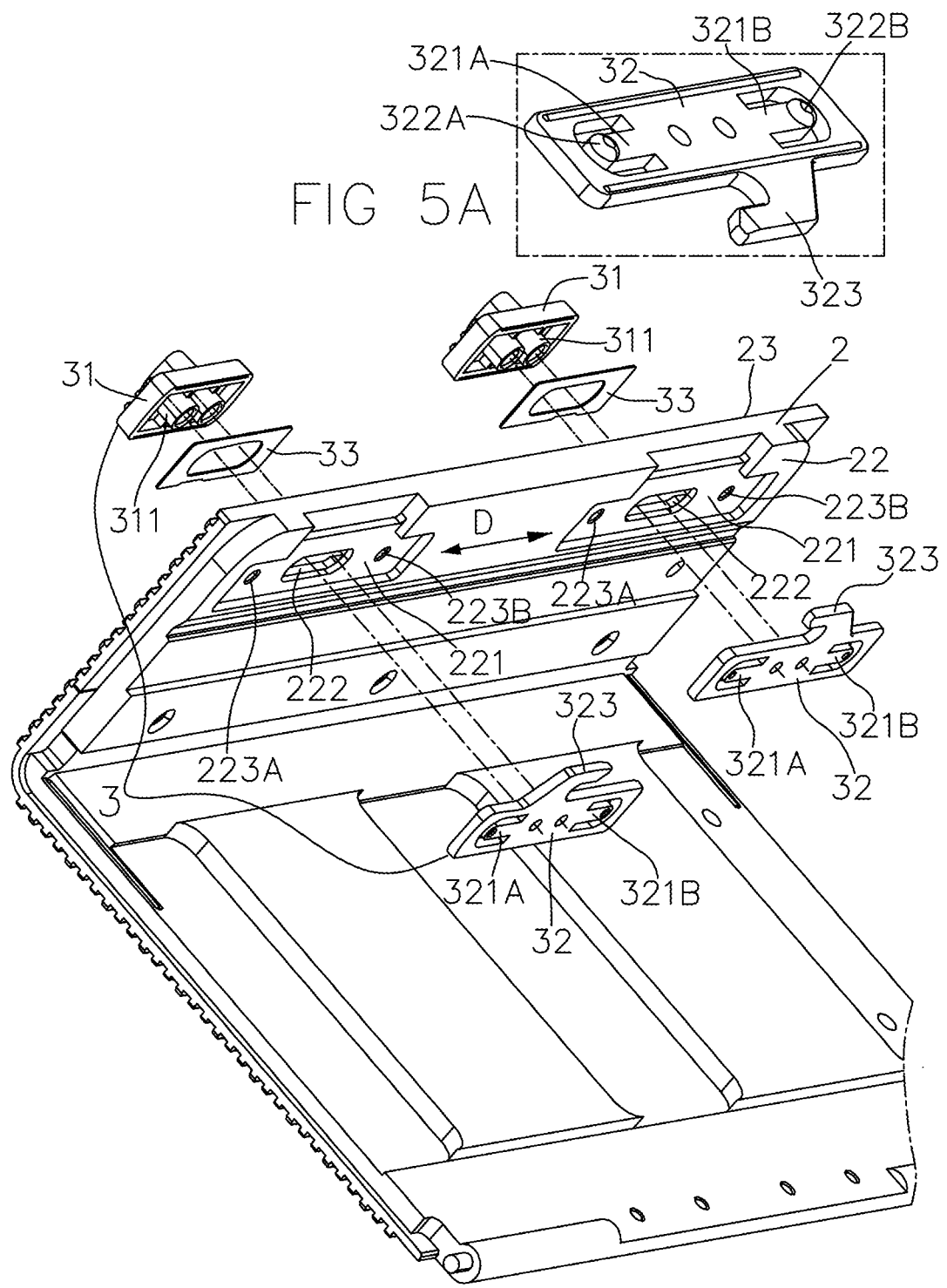
FIG. 5 is an exploded view of a control member of the present invention.
FIG. 5A is a schematic view of a switching plate of the present invention, viewing from a different angle.

In FIGS. 5 and 5A, the control member 3 includes a switching button 31 and a switching plate 32, both coupled to the cover 2. The cover 2 has an inner side 22 facing the chamber and an outer side 23 facing away from the chamber, wherein the switching button 31 is installed on the outer side 23 of the cover 2, and the switching plate 32 is installed on the inner side 22 of the cover 2. In this embodiment, the inner side 22 of the cover 2 has a groove 221 configured to be corresponsive to each respective switching plate 32, and each switching plate 32 is installed in the groove 221. In each groove 221 of the cover 2, a through hole 222 is formed along the moving direction D, and each switching button 31 and its corresponsive switching plate 32 are passed through the through hole 222 and connected with each other by a connecting member 311 for fixing and combining them as a whole in order to control them to move synchronously in the moving direction D. Preferably, a pad 33 is installed between each switching button 31 and the cover 2. In addition, two positioning holes are formed along the moving direction D in each groove 221 and defined as a left positioning hole 223A and a right positioning hole 223B respectively, and the left positioning hole 223A and the right positioning hole 223B are disposed on both sides of the through hole 222 respectively.

The switching plate 32 has two positioning portions extended in opposite direction with each other along the moving direction D and defined as a left positioning portion 321A and a right positioning portion 321B respectively, and the distance between the left positioning portion 321A and the right positioning portion 321B is smaller than the distance between the aforementioned left positioning hole 223A and the aforementioned right positioning hole 223B. In this embodiment, the switching plate 32 and its left positioning portion 321A and right positioning portion 321B are made of plastic, so that the left positioning portion 321A and the right positioning portion 321B have the elasticity for pivoting with respect to the switching plate 32. A positioning bump is formed separately at ends of the left positioning portion 321A and the right positioning portion 321B, and the two positioning bumps are defined as a left positioning bump 322A and a right positioning bump 322B respectively. When the left positioning bump 322A and the right positioning bump 322B are pressed at the bottom side of the groove 221, the left positioning portion 321A and the right positioning portion 321B are slightly pivoted with respect to the switching plate 32 to produce a resilience force for resuming the original position. When the switching button 31 is flipped, the switching plate 32 is controlled to move as shown in FIG. 6. When the right positioning bump 322B is situated at a position superimposed with the right positioning hole 223B, the resilience force as shown in FIG. 7 drives the right positioning portion 321B to resume its original position and drives the right positioning bump 322B to fall into the right positioning hole 223B, so as to provide a positioning effect. While the control member 3 is moving, at most one positioning bump falls into positioning hole, so as to achieve the effect of positioning the control member 3.

In FIGS. 5 and 6, the switching plate 32 has a tongue portion 323 extended towards the moving direction D, and the tongue portion 323 is driven and moved by the displacement of the control member 3 in order to enter into or leave from the plug-in space 133 of the latch member 13 and switch the locked status between the cover and the casing. Specifically, after the cover is covered onto the casing, the switching button 31 is flipped to move from a first position to the right along the moving direction D as shown in FIG. 8 (wherein the first position of this embodiment refers to the position when the tongue portion 323 of the switching plate 32 is disposed outside the plug-in space 133, so that the cover 2 and the casing are situated at an unlocked status). In other words, the tongue portion 323 is extended from the socket 134 of the latch member 13 into the plug-in space 133 by the displacement of the switching plate 32. Now, the tongue portion 323 is stopped at the stop portion 132, so that the control member 3 cannot leave the latch member 13 in any direction other than the moving direction D, and the cover is locked to the casing. In addition, the control member 3 can be positioned when the right positioning bump 322B falls into the right positioning hole 223B.

On the other hand, the switching button 31 is flipped to move from a second position to the left along the moving direction D as shown in FIG. 9 (wherein the second position of this embodiment refers to the position when the tongue portion 323 of the switching plate 32 is extended into the plug-in space 133 and stopped by the stop portion 132, so that the cover 2 and the casing 1 are situated at the locked status). In other words, the tongue portion 323 leaves the plug-in space 133 of the latch member 13 by the displacement of the switching plate 32. Now, the tongue portion 323 is not limited, and the control member 3 is situated at a free status, and the locked status between the cover and the casing is released. When the control member 3 is situated at the second position, the positioning effect is achieved when the left positioning bump 322A of the switching plate 32 falls into the left positioning hole 223A.

In summation of the description above, the present invention is a major breakthrough of the prior art and complies with patent application requirements, and is thus duly filed for patent application. While the invention has been described by means of specific embodiments, numerous modifications and variations could be made thereto by those skilled in the art without departing from the scope and spirit of the invention set forth in the claims.

What is claimed is:

1. A chassis door cover switch structure, comprising:
   a casing, having a chamber enclosed therein, and two latch members extending into the chamber, and each latch member having a main body and a stop portion, and a plug-in space formed between the main body and the stop portion;
   a cover, installed to the casing, and covered onto the chamber, and having an inner side facing the chamber and an outer side facing away from the chamber;
   two control members, and each control member including a switching button installed on the outer side of the cover facing away from the chamber, a switching plate installed on the inner side of the cover facing the chamber, and a tongue portion extended from the switching plate, and the switching button being coupled to the switching plate, and the switching button and the switch plate synchronously moving between a first position and a second position along a moving direction, and the tongue portion of the switching plate situated at the first position is disposed outside the plug-in space, so that the cover and the casing are situated at an unlocked status, and the tongue portion of the switching plate situated at the second position is extended into the plug-in space and stopped by the stop portion, so that the cover and the casing are situated at a locked status;

the inner side of the cover has two positioning holes formed at positions corresponsive to each of the two latch members respectively, and the two positioning holes are arranged apart from each other along the moving direction, and two positioning portions are extended from the switching plate, and the distance between the two positioning portions is smaller than the distance between the two positioning holes, and when the switching button drives the switching plate to move to the first position or the second position, the switching plate is positioned into one of the positioning holes by one of the positioning portions.

2. The chassis door cover switch structure according to claim 1, wherein the two positioning portions of the switching plate have an elastic force for pivoting with respect to the switching plate and positioning the positioning portion into the positioning hole.

3. The chassis door cover switch structure according to claim 1, wherein the cover has a groove formed on the inner side of the cover and configured to be corresponsive to each respective switching plate, and each switching plate is installed in each respective groove.

4. The chassis door cover switch structure according to claim 1, wherein the cover has a through hole configured to be corresponsive to each respective control member and extended along the moving direction, and each switching button and its corresponsive switching plate are coupled with each other by a connecting member, which passes through the through hole.

5. The chassis door cover switch structure according to claim 4, further comprising a pad installed between each switching button and the cover.

* * * * *